United States Patent [19]

Kanemori et al.

[11] Patent Number: 5,302,987

[45] Date of Patent: Apr. 12, 1994

[54] ACTIVE MATRIX SUBSTRATE INCLUDING CONNECTING ELECTRODE WITH EXTENDED PORTION

[75] Inventors: Yuzuru Kanemori; Hiroshi Fujiki; Toshiaki Fujihara, all of Tenri; Akihiko Imaya; Hiroaki Kato, both of Nara; Mikio Katayama, Ikoma; Takayoshi Nagayasu, Nara, all of Japan

[73] Assignee: Sharp Kabushiki Kaisha, Osaka, Japan

[21] Appl. No.: 875,039

[22] Filed: Apr. 28, 1992

[30] Foreign Application Priority Data

May 15, 1991 [JP] Japan ................................. 3-110464
May 22, 1991 [JP] Japan ................................. 3-117385

[51] Int. Cl.⁵ ............................................ G02F 1/1343
[52] U.S. Cl. ............................... 359/58; 359/59; 359/87
[58] Field of Search ............... 359/55, 57, 58, 59, 359/60, 87

[56] References Cited

U.S. PATENT DOCUMENTS

| Re. 33,829 | 2/1992 | Castleberry | 340/784 |
|---|---|---|---|
| 4,709,992 | 12/1987 | Ueno | 359/60 |
| 5,017,984 | 5/1991 | Tanaka et al. | 357/23.7 |
| 5,042,918 | 8/1991 | Suzuki | 257/59 |
| 5,069,534 | 12/1991 | Hirai | 359/54 |
| 5,107,355 | 4/1992 | Satoh et al. | 359/87 |
| 5,119,217 | 6/1992 | Takahashi | 359/54 |
| 5,191,453 | 3/1993 | Okumura | 359/59 |
| 5,212,574 | 5/1993 | Katayama et al. | 359/59 |

OTHER PUBLICATIONS

Patent Abstracts of Japan, vol. 15, No. 270 (P-1225) 9 Jul. 1991 and JP-A-03 091 721 (Sharp) 17 Apr. 1991-Abstract.

Patent Abstracts of Japan, vol. 13, No. 533 (P-967) 28 Nov. 1989 and JP-A-01 219 824 (Seikosha) 1 Sep. 1989-Abstract.

Patent Abstracts of Japan, vol. 14, No. 88 (P-1008) 19 Feb. 1990 and JP-A-01 297 624 (Casio) 30 Nov. 1989-Abstract.

Primary Examiner—William L. Sikes
Assistant Examiner—Kenneth Parker
Attorney, Agent, or Firm—Nixon & Vanderhye

[57] ABSTRACT

An active matrix substrate has an insulating substrate, a plurality of signal lines and a plurality of scanning lines arranged in a matrix on the insulating substrate and defining a matrix of areas, each area including a pixel electrode and a switching device. The switching device has a connecting electrode for connecting the switching device to the pixel electrode. The connecting electrode includes a rectangular main portion and an extended portion connected to the main portion, and the main portion has a side which is substantially identical in length to the width of the switching device. The main portion and the extended portion are disposed between the pixel electrode and the insulating substrate.

20 Claims, 8 Drawing Sheets

ACTIVE MATRIX SUBSTRATE INCLUDING CONNECTING ELECTRODE WITH EXTENDED PORTION

BACKGROUND OF THE INVENTION

1. Field of the Invention

The present invention relates to an active matrix substrate for use in a liquid crystal display device and the like, practically to an active matrix substrate which is used in combination with an opposing substrate having a counter electrode thereon and a display medium such as a liquid crystal interposed between the active matrix substrate and the opposing substrate.

2. Description of the Prior Art

Conventionally in a liquid crystal display device (hereinafter, referred to as the "LCD device"), an EL (electroluminescent) display device, a plasma display device and the like, a display pattern is formed on a display plane by selectively driving display pixels arranged in a matrix. As a system for selectively driving the display pixels, an active matrix driving system is known, according to which each independent pixel electrode is connected to a switching device. The active matrix driving system, which allows for high-contrast display, is used in a liquid crystal TV, a word processor, a computer and the like.

As the switching device for selectively driving the pixel electrodes, a TFT (thin film transistor), a MIM (metal-insulator-metal) device, a MOS (metal-oxide semiconductor) transistor, a diode, a varistor and the like is generally employed. Such a switching device is used to optically modulate a visible display medium such as a liquid crystal, an EL emitter, a plasma emitter and the like, thereby forming a visible display pattern on the display plane.

FIG. 11 is a plan view of a conventional active matrix substrate using an amorphous silicon (hereinafter, referred to as "a-Si") TFT having a reverse stagger structure as a switching device. In FIG. 11, a transparent insulating substrate 101 formed of glass or the like has a plurality of gate bus lines 121 arranged substantially in parallel and a plurality of source bus lines 122 arranged substantially in parallel. The gate bus lines 121 and the source bus lines 122 run perpendicularly to each other. A rectangular area defined by the two adjacent gate bus lines 121 and the two adjacent source bus lines 122 has a pixel electrode 140 formed therein. Each pixel electrode 140 is connected to a TFT 131a, and the TFT 131a has a drain electrode 133a on a rear surface of an end portion of the pixel electrode 140. The TFT 131a also has a source electrode and a gate electrode. The source electrode is constituted by a source bus branch line 122a branched from the source bus line 122, and the gate electrode is constituted by a portion 121a of the gate bus line 121. In other words, the TFT 131a is connected to one of the two gate bus lines 121 and to one of the two source bus lines 122.

FIG. 12 shows another conventional active matrix substrate using a TFT as a switching device. The gate bus line 121 has a gate bus branch line 121b branched therefrom, and a tip portion of the gate bus branch line 121b constitutes a gate electrode of the TFT 131a. The source bus line 122 has a projected portion 122a, which constitutes a source electrode of the TFT 131a. A drain electrode 133a of the TFT 131a is provided on a rear surface of an end portion of the pixel electrode 140.

FIG. 13 shows still another conventional active matrix substrate, in which each pixel electrode 140 is connected to two TFTs 131b and 131c each having the identical structure with that of the TFT 131a of FIG. 11. A drain electrode 133b of the TFT 131b and a drain electrode 133c of the TFT 131c are both provided on a rear surface of end portions of the pixel electrode 140.

FIG. 14 shows still another conventional active matrix substrate, in which each pixel electrode is connected with two TFTs 131b and 131c each having the identical structure as that of the TFT shown in FIG. 12. A drain electrode 133b of the TFT 131b and a drain electrode 133c of the TFT 131c are both provided on a rear surface of end portions of the pixel electrode 140.

FIG. 3b is an enlarged plan view of a connecting portion of the active matrix substrates of FIGS. 11 and 12, and FIG. 7b is an enlarged plan view of a connecting portion of the active matrix substrates of FIGS. 13 and 14. In FIG. 3b, the end portion of the pixel electrode 140 overlaps the drain electrode 133a. In FIG. 7b, the end portions of the pixel electrode overlap the drain electrodes 133b and 133c. It is known that such active matrix substrates have the following problems.

(1) It is possible that a portion of a step portion of the pixel electrode (the step portion being shaded in FIGS. 3b and 7b), which is formed on an end portion of the drain electrode, is undesirably thinner than the other portion as is shown in FIG. 15b. In FIG. 15a, which illustrates the pixel electrode overlapping the drain electrode in a satisfactory state, the step portion has the identical thickness with that of the other portion. The undesirable overlapping state shown in FIG. 15b tends to occur in the case when an end surface of the drain electrode is steeply inclined or the end portion of the drain electrode has an abnormal shape (for example, an edge thereof has an upward projection or the end surface is rough). Such an undesirable overlapping state of the step portion results in an increased resistance thereof and possibly a conduction failure.

(2) In the case when the pixel electrode 140 is formed by photolithography, etching liquid possibly corrodes the step portion of the pixel electrode 140 and the drain electrode 133a (or 133b and 133c). Such corrosion occurs since a photo resist film formed on a pixel electrode material to obtain the pixel electrode 140 in a desired pattern is usually adhered onto the pixel electrode material at corners d and e (or f, g, h and i) in an inferior state than in the other portion. In the case when the whole step portion is corroded, the drain electrode 133a (or 133b and 133c) and the pixel electrode 140 are electrically separated from each other, thereby causing a conduction failure.

When a conduction failure occurs, the pixel electrode 140 is not supplied with current from the TFT 131a (or 131b and 131c). Accordingly, the liquid crystal interposed between the pixel electrode 140 and the counter electrode is not applied with a sufficient voltage for display. Such a phenomenon, which is recognized as a point defect in a display device, lowers the yield of the production. In the case when such a phenomenon occurs in a wide area, a great number of point defects are generated on the display device, resulting in a fatal reduction of the yield.

In order to solve the above problem, it is known to connect two TFTs to each pixel electrode as is shown in FIGS. 13 and 14. In such an active matrix substrate, even if a conduction failure occurs between one of the TFTs and the pixel electrode 140 due to contamination of foreign objects or a defective patterning of the photo resist film, the other TFT normally functions. Accordingly, the possibility that a point defect occurs can be lower than in the active matrix substrates in FIGS. 11 and 12.

However, it rarely occurs that a conduction failure is generated in one of the TFTs due to the aforementioned undesirable overlapping state or corrosion caused in the process of photolithography while the other TFT normally functions, since two adjacent TFTs are usually produced in extremely similar conditions. Accordingly, even if the pixel electrode 140 is connected with two or more TFTs, the generation of the point defect cannot sufficiently be prevented.

SUMMARY OF THE INVENTION

The active matrix substrate of this invention, which overcomes the above-discussed and numerous other disadvantages and deficiencies of the prior art, includes an insulating substrate, a plurality of signal lines and a plurality of scanning lines arranged in a matrix on the insulating substrate and defining a matrix of areas. Each area includes a pixel electrode and a switching device. The switching device has a connecting electrode for connecting the switching device to the pixel electrode. The connecting electrode comprises a rectangular main portion and an extended portion connected to the main portion. The main portion has a side which is substantially identical in length to the width of the switching device. The main portion and the extended portion are disposed between the pixel electrode and the insulating substrate.

In an embodiment of the invention, each switching device further includes an electrode comprising a portion of a branch line branched from one of two adjacent signal lines bounding a corresponding area.

In another embodiment of the invention, each switching device further includes an electrode comprising a portion of a branch line branched from one of two adjacent scanning lines bounding a corresponding area.

The active matrix substrate of this invention includes an insulating substrate, a plurality of signal lines and a plurality of scanning lines arranged in a matrix on the insulating substrate, a plurality of areas each being defined by two adjacent signal lines and two adjacent scanning lines. Each area includes a pixel electrode and a plurality of switching devices having a connecting electrode for connecting the switching devices to the pixel electrode. The connecting electrode comprises a plurality of rectangular main portions and at least one intermediate portion for connecting the main portions to each other. Each main portion has a side which is substantially identical in length to the width of the corresponding switching device. The main portions and the intermediate portion are disposed between the pixel electrode and the insulating substrate.

In an embodiment of this invention, each switching device further includes an electrode comprising a portion of a branch line branched from one of the two adjacent signal lines.

In another embodiment of this invention, each switching device further includes an electrode comprising a portion of a branch line branched from one of the two adjacent scanning lines.

In still another embodiment of this invention, each connecting electrode comprises two rectangular main portions and an intermediate portion.

In still another embodiment of the invention, each connecting electrode comprises three rectangular main portions and two intermediate portions.

Thus, the invention described herein makes possible the objective of providing an active matrix substrate in which the possibility that a conduction failure occurs is significantly lowered and thus the yield of the production is improved.

BRIEF DESCRIPTION OF THE DRAWINGS

This invention may be better understood and its numerous objects and advantages will become apparent to those skilled in art by reference to the accompanying drawings as follows.

DESCRIPTION OF THE PREFERRED EMBODIMENTS

The present invention will be described by way of illustrating embodiments with reference to the accompanying drawings. Active matrix substrates of all the following examples employ an a-Si TFT as a switching device.

EXAMPLE 1

Figure 1:
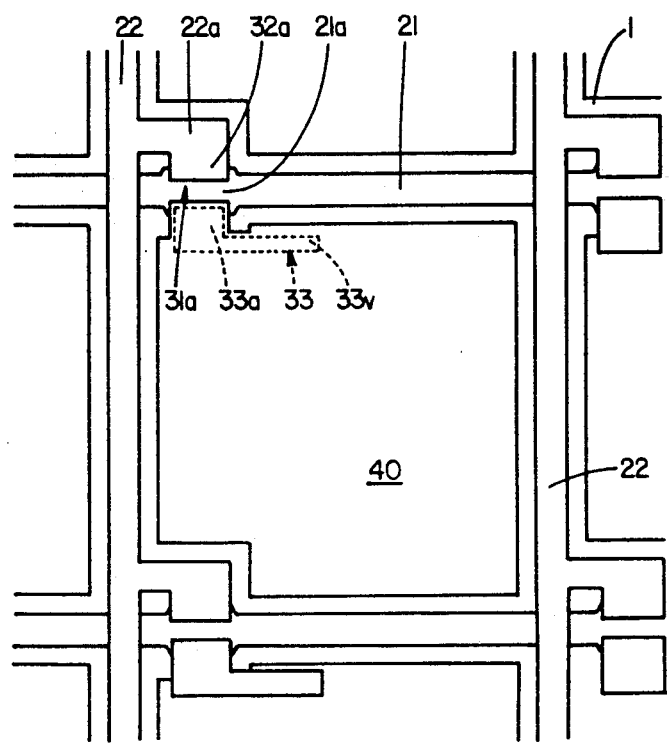
FIG. 1 is a plan view of an active matrix substrate according to a first example of the present invention.
Figure 2:
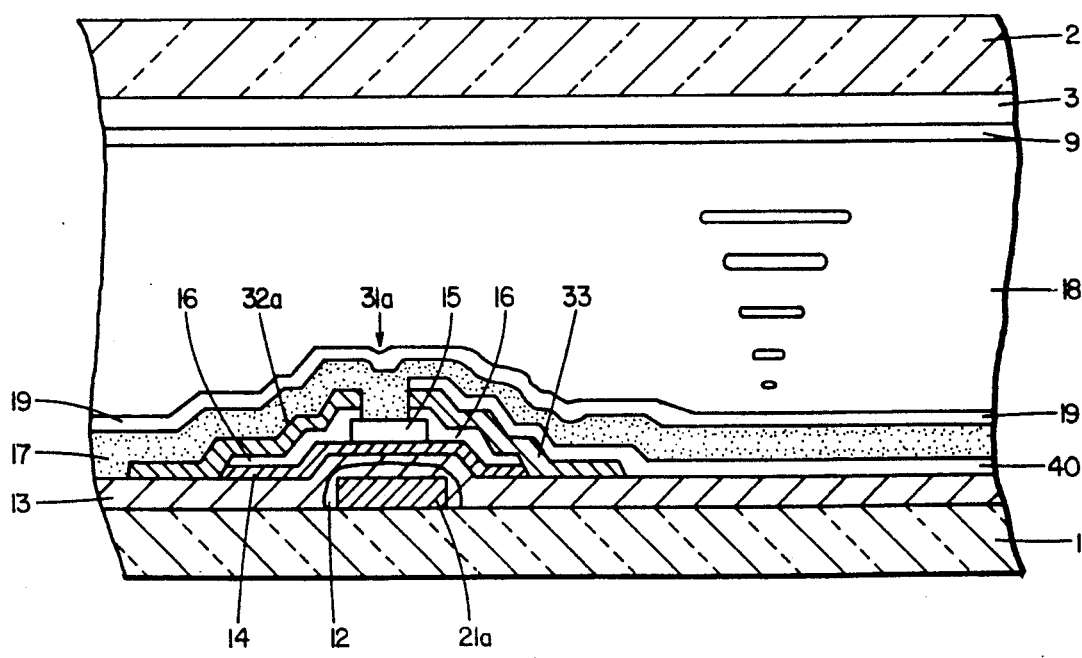
FIG. 2 is a cross sectional view of the active matrix substrate of FIG. 1.

FIG. 1 is a plan view of an active matrix substrate according to a first example of the present invention. FIG. 2 is a cross sectional view of the active matrix substrate of the first example which is assembled with an opposing substrate 2 and a liquid crystal layer 18 interposed between the active matrix substrate and the opposing substrate 2. The active matrix substrates of all the following examples are represented by substantially identical cross sections with that of FIG. 2 except for the reference numerals.

In FIG. 1, an insulating substrate 1 has a plurality of gate bus lines 21 acting as scanning lines and a plurality of source bus lines 22 acting as signal lines thereon. Each rectangular area defined by two adjacent gate bus lines 21 and two adjacent source bus lines 22 has a pixel electrode 40. In this way, the pixel electrodes 40 are arranged in a matrix. Each pixel electrode is connected to a TFT 31a.

The gate bus line 21 has a plurality of portions having a larger width than the other portions, and each of the above plurality of portions functions as a gate electrode 21a of the TFT 31a. The source bus line 22 has a plurality of source bus branch lines 22a, and a tip of each source bus branch line 22a constitutes a source electrode 32a of the TFT 31a.

The TFT 31a is connected to the pixel electrode 40 through a drain electrode 33 (indicated by a broken line) provided on a rear surface of the pixel electrode 40. The drain electrode 33 includes a rectangular main portion 33a corresponding to the conventional drain electrode 133a of FIG. 11 and an extended portion 33v extended from the main portion and having a rectangular shape.

A production method of the active matrix substrate of the first example will be described referring to FIG. 2.

The gate bus line 21 including the gate electrode 21a is formed of Ta on the insulating substrate 1 formed of transparent glass. The gate bus line 21 is generally formed by laminating one or a plurality of layers of a conductive metal such as Ta, Ti, Al or Cr by a sputtering method and then patterning the laminated conductive metal. An insulating layer formed of $Ta_2O_5$ or the like acting as a base coating layer may be formed on the insulating substrate 1 before forming the gate bus line 21.

Then, a gate insulating film 13 formed of SiNx is formed on the gate bus line 21 by a plasma CVD method to have a thickness of 3,000 Å. Before the formation of the gate insulating film 13, an oxide film 12 may be formed of $Ta_2O_5$ by way of anodic oxidization of the gate bus line 21 for the purpose of improving the insulating effect of the gate insulating film 13.

A semiconductor layer 14 is formed of a-Si on the gate insulating film 13 to have a thickness of 300 Å, and then an etching stopper layer 15 is formed of $SiN_x$ on the semiconductor layer 14 to have a thickness of 2,000 Å. The semiconductor layer 14 and the etching stopper layer 15 are both formed by the plasma CVD method. The etching stopper layer 15 is patterned, thereafter an n+ a-Si layer 16 added with phosphorus is formed on the semiconductor layer 14 and the etching stopper layer 15 to have a thickness of 800 Å by the plasma CVD method. The n+ a-Si layer 16 is formed in order to improve the ohmic contact between the semiconductor layer 14 and the source electrode 32a and between the semiconductor layer 14 and the drain electrode 33, which are to be formed on the n+ a-Si layer 16.

The n+ a-Si layer 16 is patterned, thereafter Ti is laminated on the n+ a-Si layer 16 by the sputtering method and is patterned, whereby the source electrode 32a and the drain electrode 33 including the main portion 33a and the extended portion 33v are obtained. The source electrode 32a and the drain electrode 33 may be formed of Al, Mo, Cr or the like instead of Ti. In this way, the a-Si TFT 31a shown in FIG. 2 is obtained.

Thereafter, an ITO (indium tin oxide) layer acting as a transparent conductive layer is laminated on the gate insulating film 13 and is patterned to obtain the pixel electrode 40 and the source bus line 22. The source bus line 22 is patterned so as to overlap the source electrode 32a. The pixel electrode 40 is patterned so as to be provided in the area defined by the two adjacent gate bus lines 21 and the two adjacent source bus lines 22 and so as to totally cover the drain electrode 33 of the TFT 31a with an end portion thereof. In this way, the pixel electrode 40 and the drain electrode 33 of the TFT 31a go into the state of conduction.

The insulating substrate 1 having the pixel electrode 40, the source electrode 32a and the drain electrode 33 and the like thereon is totally covered with a protective film 17 formed of $SiN_x$. The protective film 17 may be formed except for an area on a center of the pixel electrode 40, the area constituting a window region. The protective film 17 is covered with an alignment film 19. The alignment film 19 may have a window region at a portion thereof above a center of the pixel electrode 40. In this way, the active matrix substrate according to the first example is obtained.

The opposing substrate 2 having the counter electrode 3 and an alignment film 9 thereon is provided opposed to the active matrix substrate. Then, the liquid crystal layer 18 is sandwiched between the active matrix substrate and the opposing substrate 2. In this way, an LCD device is obtained.

Figure 3A:
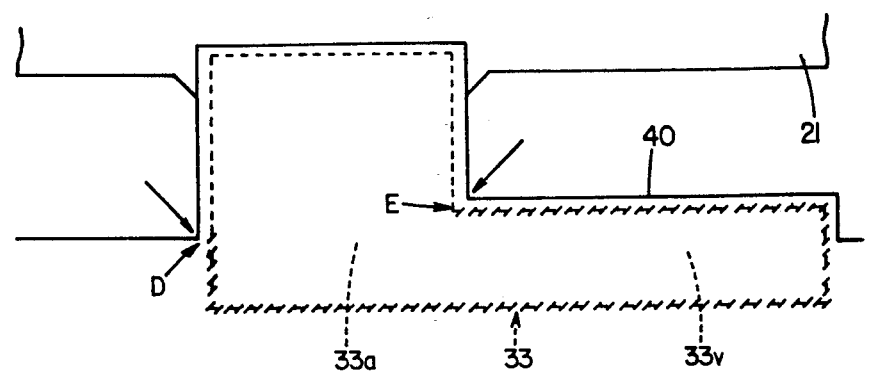
FIG. 3a is an enlarged plan view of a connecting portion of a pixel electrode and a drain electrode of an active matrix substrate of FIG. 1.
Figure 3B:
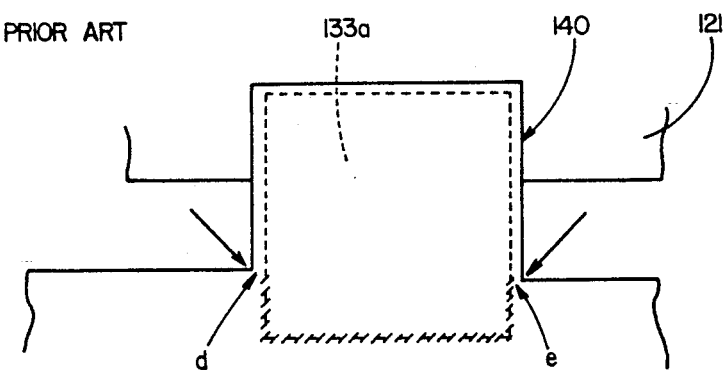
FIG. 3b is an enlarged plan view of a connecting portion of a drain electrode and a pixel electrode of a conventional active matrix substrate.
Figure 11:
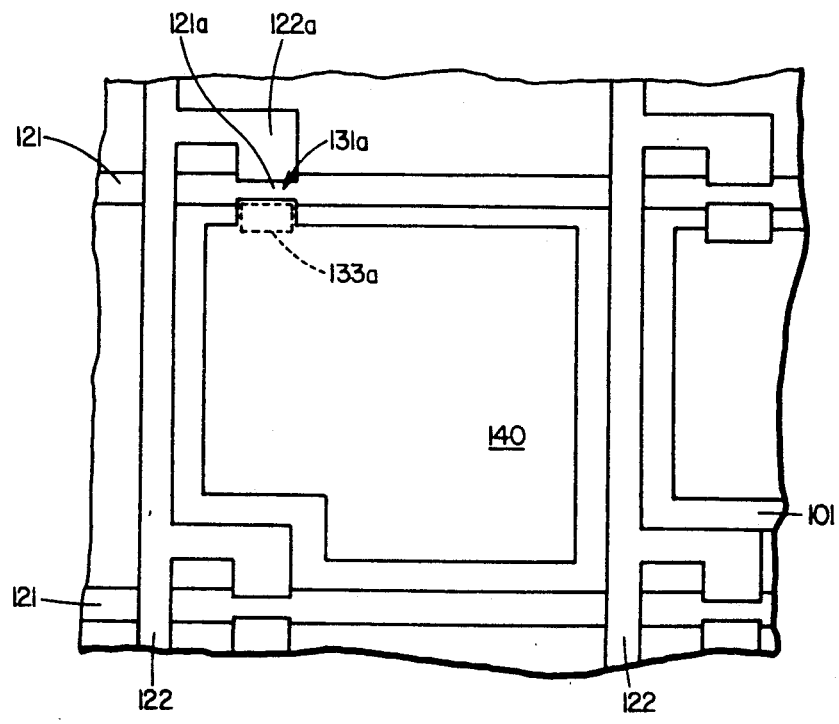
FIG. 11 is a plan view of the conventional active matrix substrate shown in FIG. 3b.

As is shown in FIG. 3a, the active matrix substrate according to the first example has the drain electrode 33 including the extended portion 33v in addition to the main portion 33a which corresponds to the conventional drain electrode 133a of FIG. 11. Accordingly, the overlapping area of the drain electrode 33 and the pixel electrode 40 is larger than in the conventional active matrix substrate. This results in a larger total length of a step portion of the pixel electrode 40 (namely, the shaded area of FIG. 3a) than in the conventional active matrix substrate. Even if an area of the step portion of the pixel electrode 40 overlaps the drain electrode 33a in an undesirable state, the area is negligibly small with respect to the long step portion. Therefore, the possibility that a conduction failure occurs is extremely low.

During an etching process to obtain the pixel electrode 40, an etching liquid possibly corrodes the pixel electrode 40 from corners D and E. However, the active matrix substrate according to the first example has an extremely low possibility that the etching liquid spreads to corrode the whole area of the step portion, owing to the sufficient length thereof. Accordingly, there is substantially no possibility that a conduction failure occurs.

EXAMPLE 2

Figure 4:
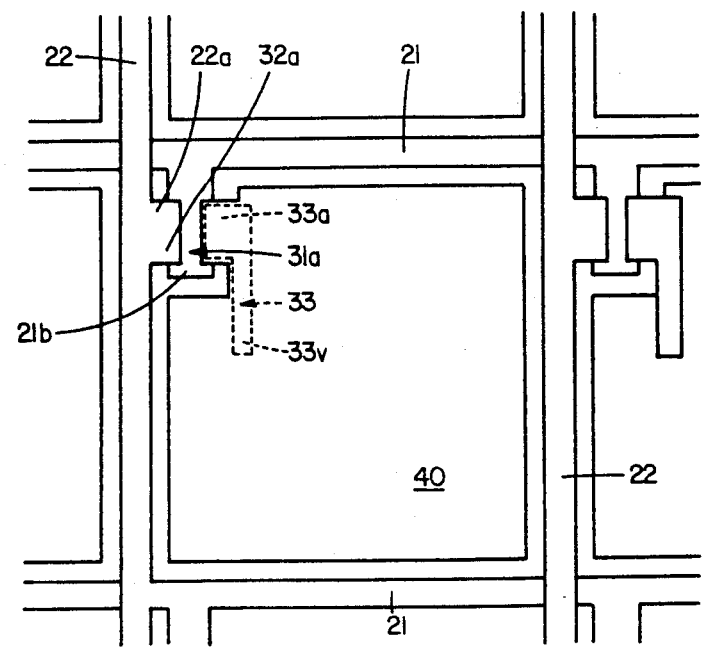
FIG. 4 is a plan view of an active matrix substrate according to a second example of the present invention.

FIG. 4 is a plan view of an active matrix substrate according to a second example of the present invention. The TFT 31a is provided at a tip portion of the gate bus branch line 21b branched from the gate bus line 21. The source bus line 22 has a projected portion 22a as a source bus branch line, and a tip portion of the projected portion 22a constitutes the source electrode 32a of the TFT 31a. Except for the abovementioned points, the active matrix substrate has the same construction as that of the first example.

Figure 12:
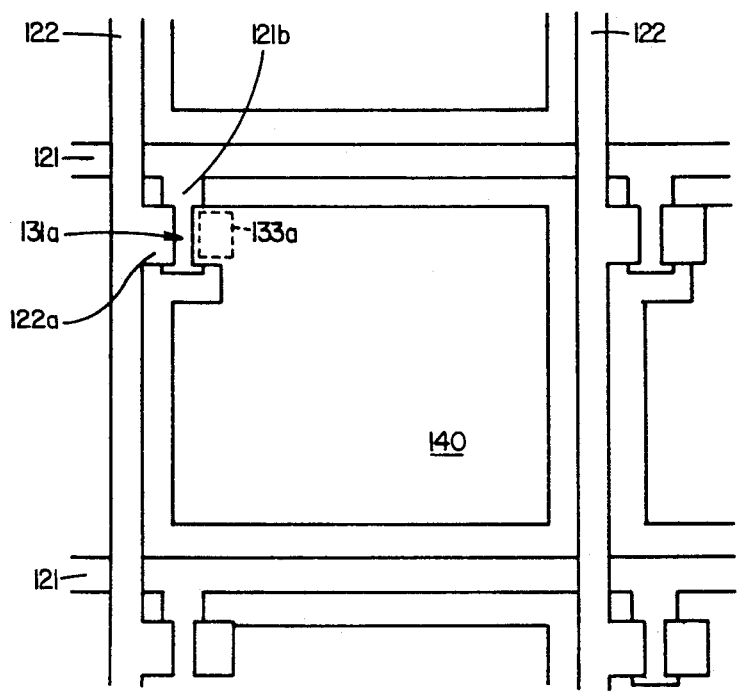
FIG. 12 is a plan view of another conventional active matrix substrate.

Since the drain electrode 33 has the extended portion 33v in addition to the main portion 33a, which corresponds to the drain electrode 133a of FIG. 12, the second example offers the same effects as those of the first example, and the possibility that a conduction failure occurs is extremely low.

Figure 5A:
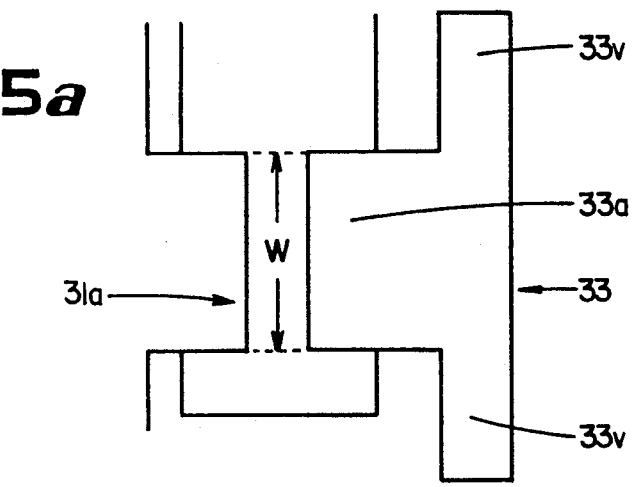
FIGS. 5a through 5c are plan views of modified examples of the drain electrode according to the present invention.
Figure 5B:
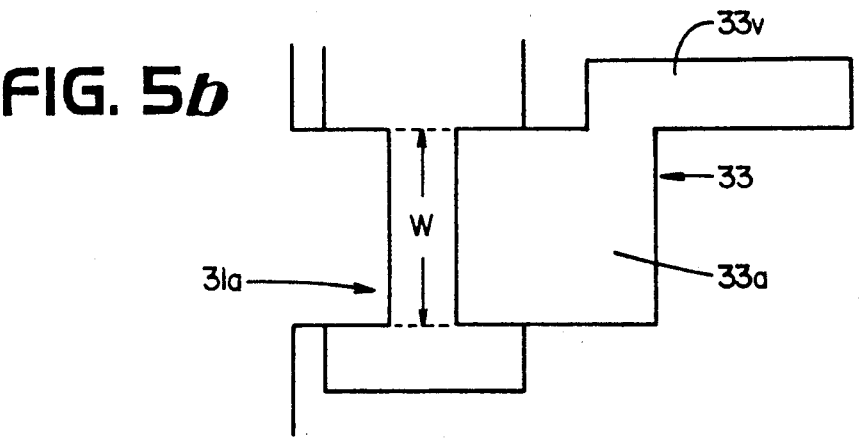
Figure 5C:
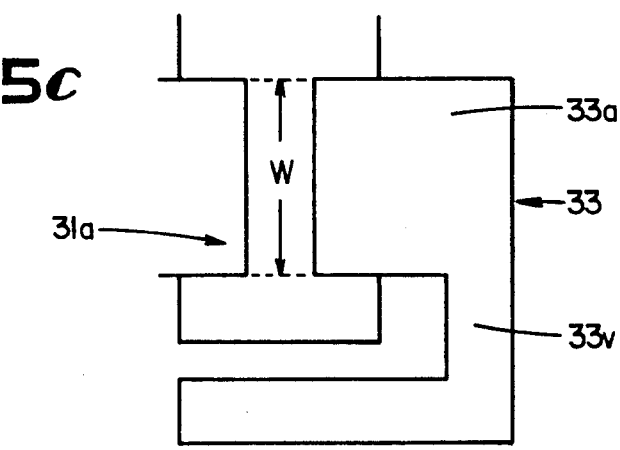

FIGS. 5a through 5c illustrate modified examples of the drain electrode 33 of the active matrix substrates of the first and the second examples. In FIG. 5a, the extended portions 33v are extended in directions in parallel with the channel width W of the TFT 31a. In FIG. 5b, the extended portion 33v is extended in a direction perpendicular to the channel width W. The extended portion 33v may be provided at any position along the right side of the main portion 33a. In FIG. 5c, the extended portion 33v is provided in an L shape on a side of the main portion 33a. In any of the first, the second and the modified examples, the extended portion 33v is added to the main portion 33a having a side which is substantially identical in length to that of the channel width W of the TFT 31a and corresponding to the conventional drain electrode 133a. Owing to such a construction, the overlapping area of the pixel electrode 40 and the drain electrode 33 is increased, thereby significantly lowering the possibility that a conduction failure occurs.

EXAMPLE 3

Figure 6:
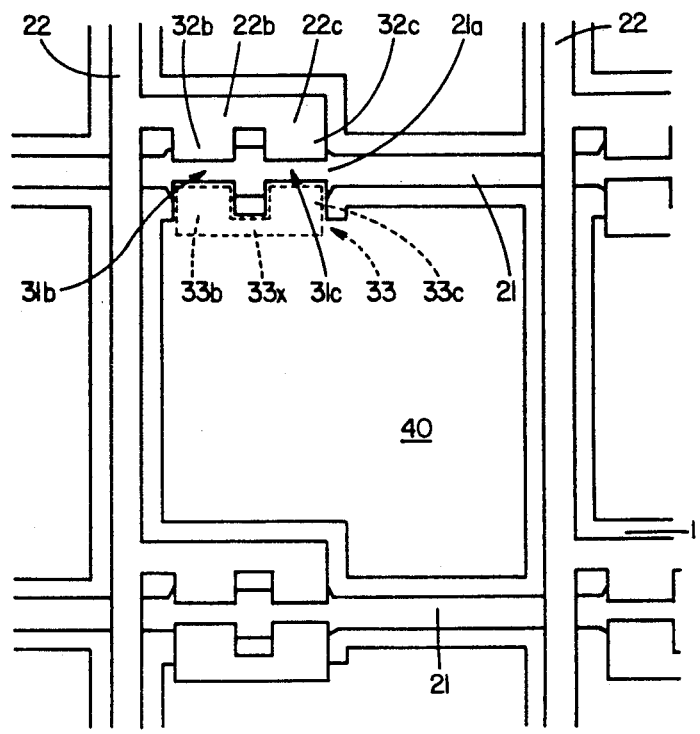
FIG. 6 is a plan view of an active matrix substrate according to a third example of the present invention.

FIG. 6 is a plan view of an active matrix substrate according to a third example of the present invention.

The pixel electrodes are arranged in a matrix in the same manner as in the first example. Each pixel electrode 40 is connected to two TFTs 31b and 31c. The gate bus line 21 has a plurality of portions having a larger width than the other portions, and each of the above plurality of portions constitutes a gate electrode 21a belonging to the TFTs 31b and 31c.

Figure 13:
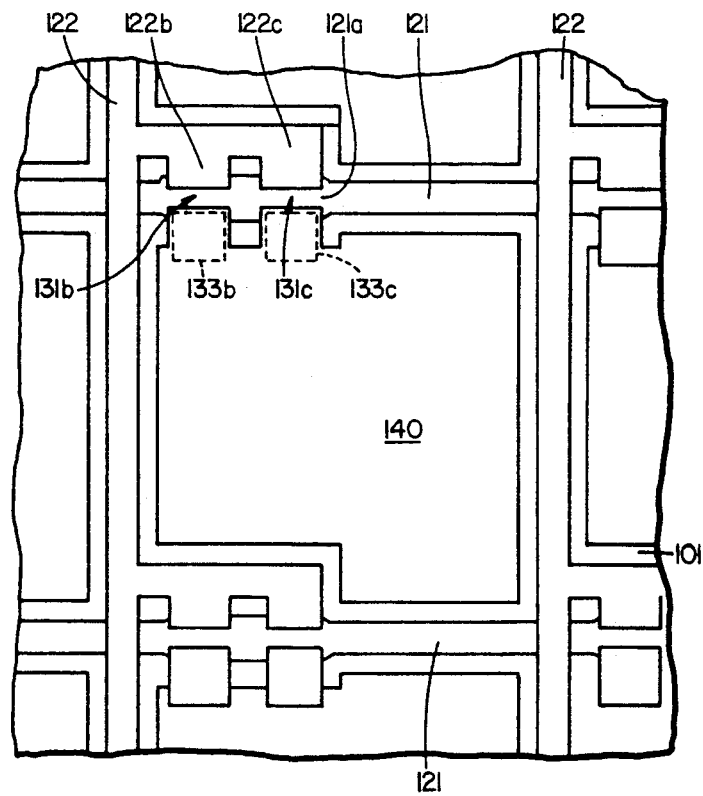
FIG. 13 is a plan view of the conventional active matrix substrate shown in FIG. 7b.

The TFTs 31b and 31c are connected to the pixel electrode 40 through the drain electrode 33 formed on a rear surface of the pixel electrode 40. As is shown in FIG. 6, the drain electrode 33 includes two main portions 33b and 33c and an intermediate portion 33x for connecting the main portions 33b and 33c. The main portions 33b and 33c respectively correspond to the conventional drain electrodes 131b and 131c of FIG. 13.

The source bus line 22 has a source bus branch line 22b in the vicinity of the TFT 31b, and a tip portion of the source bus branch line 22b constitutes a source electrode 32b. The source bus branch line 22b is connected with another source bus branch line 22c, and a tip portion of the source bus branch line 22c constitutes a source electrode 32c of the TFT 31c.

The active matrix substrate according to the third example is produced in the same way as that of the first example except that the source electrodes 32b and 32c, the drain electrode 33 and the pixel electrode 40 are patterned to be shaped as mentioned above.

Figure 7A:
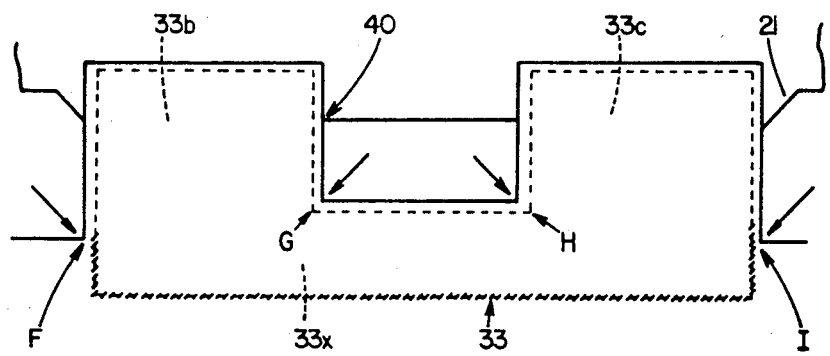
FIG. 7a is an enlarged plan view of a connecting portion of a drain electrode and a pixel electrode of an active matrix substrate of FIG. 6.
Figure 7B:
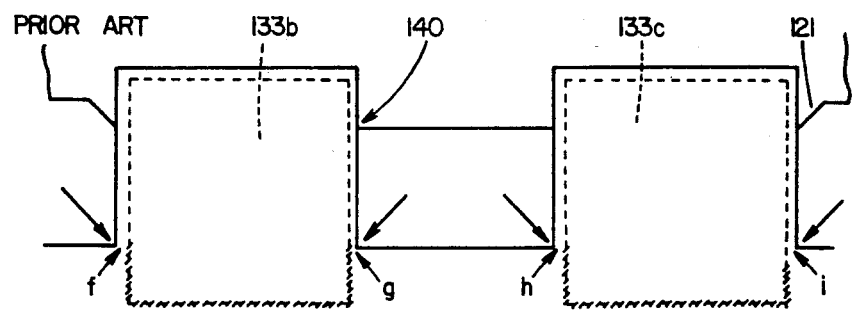
FIG. 7b is an enlarged plan view of a connecting portion of a drain electrode and a pixel electrode of another conventional active matrix substrate.

As is shown in FIG. 7a, the active matrix substrate according to the third example has the drain electrode 33 including the intermediate portion 33x in addition to the main portions 33b and 33c. Accordingly, the overlapping area of the drain electrode 33 and the pixel electrode 40 is larger than in the conventional active matrix substrate. This results in a larger total length of a step portion of the pixel electrode 40 (namely, the shaded area of FIG. 7a) than in the conventional active matrix substrate. Therefore, the third example offers the same effects as those of the first and the second examples, and the possibility that a conduction failure occurs is significantly reduced.

EXAMPLE 4

Figure 8:
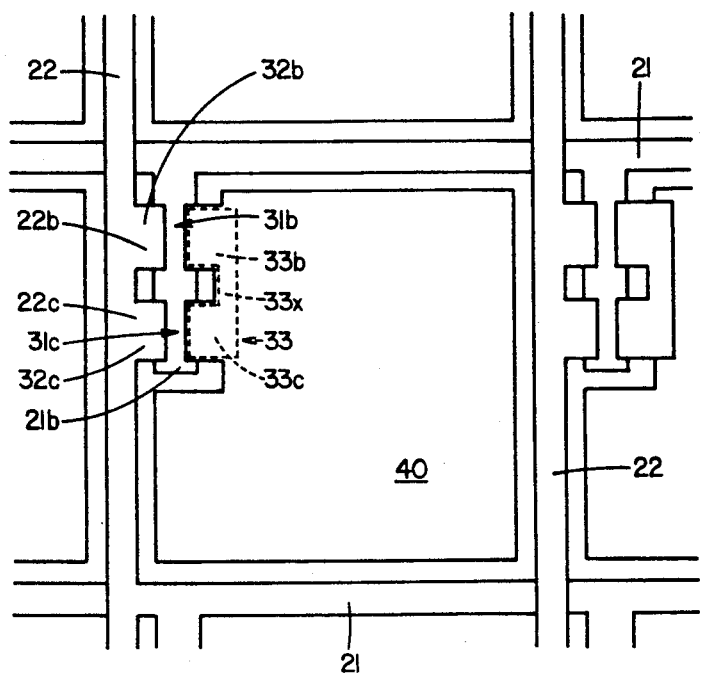
FIG. 8 is a plan view of an active matrix substrate according to a fourth example of the present invention.

FIG. 8 is a plan view of an active matrix substrate according to a fourth example of the present invention. The TFTs 31b and 31c are provided at tip portions of the gate bus branch line 21b branched from the gate bus line 21. The source bus line 22 has projected portions 22b and 22c as source bus branch lines, and tip portions of the projected portions 22b and 22c constitute the source electrodes 32b and 32c of the TFTs 31b and 31c. Except for the above-mentioned points, the active matrix substrate of the fourth example has the same construction as that of the third example.

Figure 14:
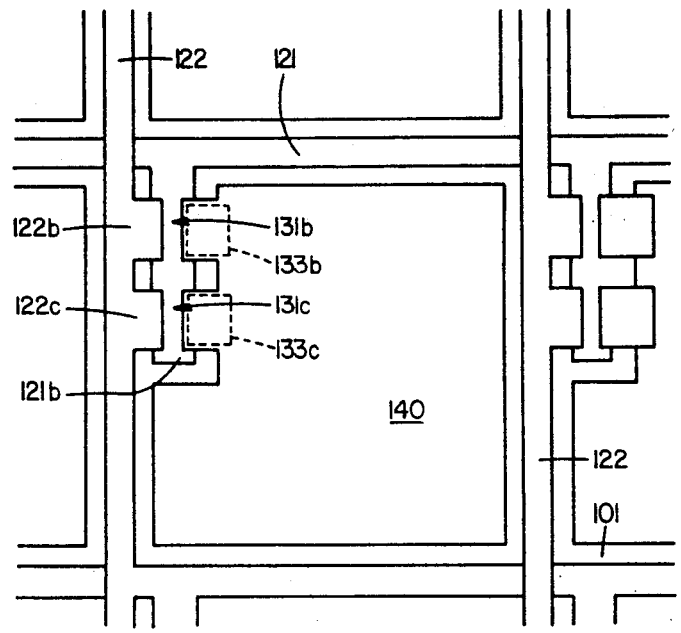
FIG. 14 is a plan view of still another conventional active matrix substrate.
Figure 15A:
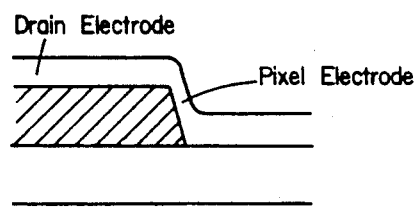
FIG. 15a is a cross sectional view of a pixel electrode overlapping a drain electrode in a satisfactory state.
Figure 15B:
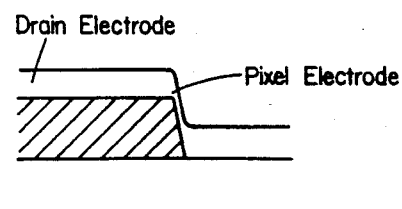
FIG. 15b is a cross sectional view of a pixel electrode overlapping a drain electrode in an undesirable state.

Since the drain electrode 33 in the fourth example has the intermediate portion 33x in addition to the main portions 33b and 33c which respectively correspond to the conventional drain electrodes 133b and 133c of FIG. 14, the fourth example offers the same effects as those of the third example, and the possibility that a conduction failure occurs is extremely low.

EXAMPLE 5

Figure 9:
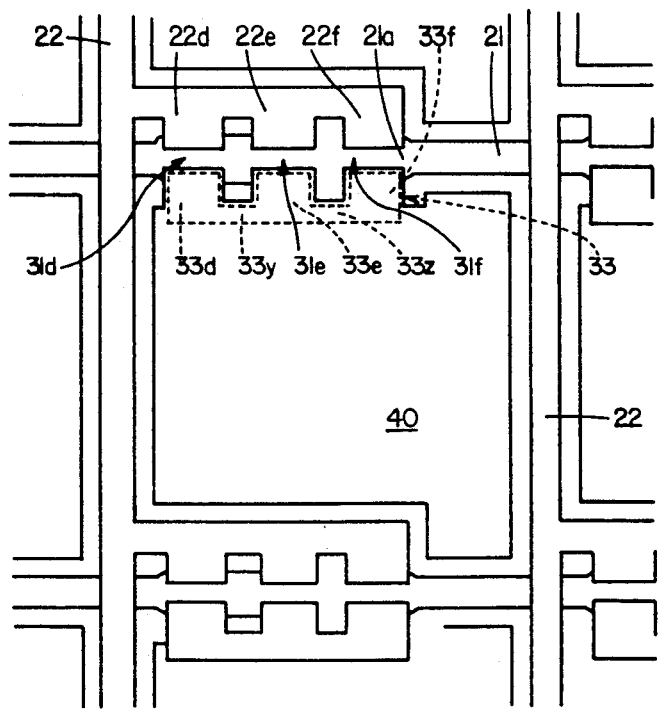
FIG. 9 is a plan view of an active matrix substrate according to a fifth example of the present invention.

FIG. 9 is a plan view of an active matrix substrate according to a fifth example of the present invention, in which each pixel electrode 40 is connected to three TFTs 31d, 31e and 31f. The drain electrode 33 formed on a rear surface of the pixel electrode 40 includes three main portions 33d, 33e and 33f and intermediate portions 33y and 33z. The main portions 33d, 33e and 33f each correspond to the conventional drain electrode (for example, 133a of FIG. 11). The source bus line 22 has source bus branch lines 22d, 22e and 22f, tip portions of which respectively constitute source electrodes 32d, 32e and 32f belonging to the TFTs 31d, 31e and 31f.

EXAMPLE 6

Figure 10:
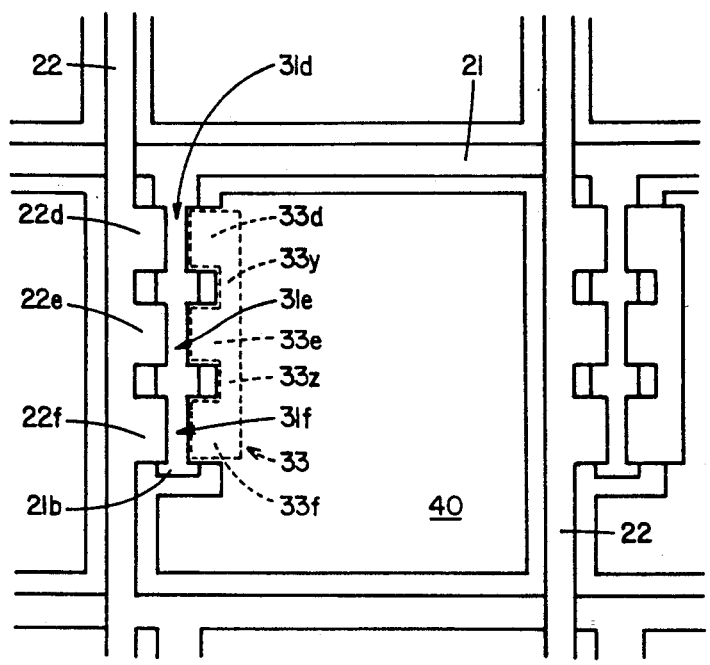
FIG. 10 is a plan view of an active matrix substrate according to a sixth example of the present invention.

FIG. 10 is a plan view of an active matrix substrate according to a sixth example of the present invention, in which each pixel electrode 40 is connected to three TFTs 31d, 31e and 31f. The TFTs 31d, 31e and 31f are provided on the gate bus branch line 21b branched from the gate bus line 21. The source bus line 22 has projected portions 22d, 22e and 22f as source bus branch lines, tip portions of which respectively constitute the source electrodes 32d, 32e and 32f belonging to the TFTs 31d, 31e and 31f.

According to the fifth and the sixth examples, the drain electrode 33 includes the intermediate portions 33y and 33z in addition to the three main portions 31d, 31e and 31f. Therefore, the fifth and the sixth examples offer the same effects as all the preceding examples. As a result, the possibility that a conduction failure occurs is significantly reduced.

Although each pixel electrode is connected to one, two or three TFTs in the above examples, each pixel electrode may be connected to four or more TFTs, and the same effects can be obtained.

Although an a-Si TFT is used as the switching device in the above examples, a MIM device, a MOS transistor, a diode, a varistor and the like may also be used.

The present invention may be applied to an active matrix substrate having an additional capacitance electrode for accumulating a voltage signal which is sent from the switching device for the purpose of improving the image quality.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing one or more of the features of patentable novelty that reside in the present invention, including all features that would be treated as equivalents thereof by those skilled in the art to which this invention pertains.

What is claimed is:

1. An active matrix substrate having an insulating substrate, a plurality of signal lines and a plurality of scanning lines arranged in a matrix on the insulating substrate and defining a matrix of areas, each area including a pixel electrode and a switching device, the switching device having a connecting electrode for connecting the switching device to the pixel electrode,
    wherein the connecting electrode comprises
    a rectangular main portion having four edges including a channel edge which both runs parallel to a channel width of the switching device and is closest to a gate of the switching device;
    an extended portion connected to the main portion at an edge thereof which is contiguous with the channel edge and at the main portion edge farthest from the channel edge;
    said extended portion having an elongated rectangular portion at the point of attachment, said elongated rectangular portion having a width which is narrower then one of the edges of the rectangular main portion;
    the main portion an the extended portion being disposed between the pixel electrode and the insulating substrate.

2. An active matrix substrate according to claim 1, wherein each switching device further includes an electrode comprising a portion of a branch line branched from one of two adjacent signal lines bounding a corresponding area.

3. An active matrix substrate according to claim 1, wherein each switching device further includes an electrode comprising a portion of a branch line branched from one of two adjacent scanning lines bounding a corresponding area.

4. An active matrix substrate for use in a transmissive liquid crystal display device comprising:
    an insulating substrate;
    a plurality of source bus lines acting as signal lines formed on the insulating substrate;
    a plurality of gate bus lines acting as scanning lines formed on the insulation substrate;
    a pixel electrode arranged in a matrix defined by said two adjacent signal lines and said two adjacent scanning lines;
    a plurality of switching devices connected to said each pixel electrode; and
    a drain electrode for connecting the switching devices to the pixel electrode;
    wherein the drain electrode comprises two rectangular main portions, each main portion having a respective one of the switching devices, each rectangular main portion having four edges including a channel edge which both runs parallel to a channel width of the respective switching device and is closest to a gate of the respective switching device;
    an extended portion connecting the main portions, the extended portion connected to each main portion at an edge thereof which is contiguous with the channel edge and at the main portion edge farthest form the channel edge;
    said extended portion having an elongated rectangular shape, the width thereof perpendicular to the channel width being narrower then the width of the rectangular portions perpendicular to the channel widths;
    the main portion and the extended portion being disposed between the pixel electrode and the insulating substrate.

5. An active matrix substrate according to claim 4, wherein each switching device further includes an electrode comprising a portion of a branch line branched from one of the two adjacent signal lines.

6. An active matrix substrate according to claim 4, wherein each switching device further includes an electrode comprising a portion of a branch line branched from one of the two adjacent scanning lines.

7. An active matrix substrate according to claim 4, wherein each drain electrode comprises two rectangular main portions and an extended portion.

8. An active matrix substrate according to claim 4, wherein each drain electrode comprises three rectangular main portions and two extended portions.

9. An active matrix substrate according to claim 5, wherein each drain electrode comprises two rectangular main portions and an extended portion.

10. An active matrix substrate according to claim 5, wherein each drain electrode comprises three rectangular main portions and two extended portions.

11. An active matrix substrate according to claim 6, wherein each drain electrode comprises two rectangular main portions and an extended portion.

12. An active matrix substrate according to claim 6, wherein each drain electrode comprises three rectangular main portions and two extended portions.

13. An active matrix substrate according to claim 1, wherein the extended portion is added to the main portion at a side of the main portion which is substantially identical in length to a channel width of the switching device.

14. An active matrix substrate according to claim 1, wherein the extended portion has an elongated rectangular shape having a major axis parallel to a channel width of the switching device.

15. An active matrix substrate according to claim 1, wherein the extended portion has an elongated rectangular shape having a major axis perpendicular to a channel width of the switching device.

16. An active matrix substrate according to claim 1, wherein the extended portion has a substantially L-shape.

17. An active matrix substrate according to claim 1, wherein the extended portion is entirely disposed beneath the pixel electrode.

18. An active matrix substrate according to claim 4, wherein the extended portion is added to the main portion at a side of the main portion which is substantially identical in length to a channel width of the switching device.

19. An active matrix substrate according to claim 4, wherein the extended portion has an elongated rectangular shape having a major axis parallel to a channel width of the switching device.

20. An active matrix substrate according to claim 4, wherein the extended portion is entirely disposed beneath the pixel electrode.

* * * * *